Patented Oct. 1, 1940

2,216,253

UNITED STATES PATENT OFFICE 2,216,253

PRODUCTION OF LUBRICATING OILS

Helmuth G. Schneider and Lewis A. Bannon, Roselle, N. J., assignors to Standard Oil Development Company, a corporation of Delaware No Drawing. Application January 19, 1937, Serial No. 121,306

6 Claims. (Cl. 196—10)

The present invention relates to novel lubricating oils and novel methods of preparing same.

It has been known for many years that isobutylene could be polymerized to an oil, but so little has been known as to the effect of reaction conditions, and the original literature reference on this subject was so indefinite that those skilled in the art have not heretofore been successful in preparing a high quality lubricating oil from isobutylene. On the other hand, it has more recently been discovered that if isobutylene is polymerized at temperatures below about −10° C. with boron fluoride, a very high molecular weight plastic solid polymer is obtained, having molecular weight ranging from about 1,000 to 200,000, depending upon the exact conditions of polymerization.

It has now been discovered and is the primary feature of the present invention that if isobutylene is polymerized while dissolved in di-isobutylene, tri-isobutylene, or a liquid consisting of a mixture of lower molecular weight polymers of isobutylene at temperatures from about −50 to about +50° or 100° C., and preferably about −10° C. to about room temperature, using a Friedel-Craft type halide, preferably boron fluoride, as the catalyst, high quality synthetic lubricating oils are produced, having a molecular weight up to about 7,000–8,000. Such oils are found to have viscosities ranging from about 100–20,000 seconds Saybolt at 100° F. and about 50–500 seconds Saybolt at 210° F., a viscosity index above 100, a low Conradson carbon and the great advantage of being wax-free and therefore will not congeal at low temperatures. The expression "viscosity index" (V. I.) refers to the viscosity/temperature characteristics of the oil as described by Dean and Davis in Chem. & Met., Vol. 36, p. 618–19, October, 1929. High V. I. means low change in viscosity with changes in temperatures.

The invention may be illustrated by a comparison of the following experiments:

Example 1

Isobutylene dissolved in a $C_4$ cut, which is a petroleum hydrocarbon fraction obtained in a refinery, was polymerized at the boiling point of the $C_4$ cut (about 0° C.) with boron fluoride, produced extremely high viscosity oils, i. e., 1,000–2,000 seconds Saybolt at 210° F. This is too high.

Example 2

Isobutylene dissolved in di-isobutylene, using equal amounts of each, under the same conditions, gave an oil having a viscosity of 4600 seconds Saybolt at 100° F. and 493.6 seconds at 210° F., the V. I. being 126.

Example 3

One liter of isobutylene was dissolved in one liter of di-isobutylene and the mixture was treated with boron fluoride at −40° C. The temperature, not being controlled, rose to 50° C. The product was an oil having Saybolt viscosities of 5,551 seconds at 100° F. and 288 seconds at 210° F., the V. I. being 107.

Example 4

50% of isobutylene in di-isobutylene was treated with aluminum chloride catalyst at 0° C. and the resulting oil was found to have a viscosity of 11,705 seconds Saybolt at 100° F. and 385.2 seconds at 210° F., the V. I. being 94.

Example 5

50% of isobutylene in di-isobutylene was treated at 0° C. with $BF_3$ gas. After a vacuum distillation to remove unreacted material and some of the low-boiling product, an oil was obtained having a viscosity of 4,600 seconds Saybolt at 100° F. and 493 seconds at 210° F., the V. I. being 140.

Although the mechanism of the operation of the invention is not thoroughly understood, it is believed that the di-isobutylene present acts as an active poison for the polymerization of the isobutylene and probably enters into some co-polymerization therewith and hence it is intended that this invention be considered as applying broadly to the polymerization of isobutylene in the presence of a large amount of solvent or diluent capable of acting as a poison to the normally expected polymerization of isobutylene to a very viscous liquid or semi-solid plastic or rubbery substance.

The oils produced according to the present invention can be used directly as lubricating oils for aviation engines since they have the favorable characteristics noted above.

By adjusting the proportion of di-isobutylene to isobutylene, polymers of various molecular weights may be prepared at a given temperature. For example, by using a volume ratio of dimer: isobutylene of substantially more than 1.0, lighter oils having viscosities corresponding to mineral white oils, known commercially as Nujol (220 seconds Saybolt at 100° F.) and Marcol (85 seconds Saybolt at 100° F.), may be produced. These could be used for spindle oils, ice machine oils, etc.

Instead of using pure isobutylene, a mixed petroleum hydrocarbon fraction containing a substantial amount of isobutylene may be used. For example, the C4 cut referred to above which may contain 10 to 15 or 20% of isobutylene may be polymerized in di-isobutylene, tri-isobutylene, etc. to produce low viscosity oils having a relatively high viscosity index.

Although di-isobutylene and tri-isobutylene have been mentioned as representative materials which will act as active poisons to cause the polymerization of isobutylene to high V. I. lubricating oils having a viscosity not greater than about 500 seconds Saybolt at 210° F. instead of extremely viscous liquids or plastic solids, other low molecular weight polymers of isobutylene may be used, for instance, up to polymers consisting of 4 or 5 molecules of isobutylene, although the di-isobutylene is preferred.

Although, as stated above, the volume ratio of the isobutylene:di-isobutylene may vary according to the characteristics desired in the final product, ordinarily the amount of di-isobutylene should be between 10% and 500% by volume of the isobutylene, the latter being calculated on the basis of liquid phase whether it is actually used in liquid or gaseous phase.

Although the invention has been described as particularly applicable to the polymerization of isobutylene, other iso-olefines may be used which normally tend to polymerize in the same manner as isobutylene, for example, iso-amylene, iso-hexylene, etc.

It is not intended that this invention be limited to any of the specific examples given, nor to any theory of the mechanism of the operation of the invention, but only by the appended claims in which it is intended to claim all novelty inherent in the invention as broadly as the prior art permits.

We claim:

1. The method of producing a lubricating oil comprising the steps of mixing substantial proportions of isobutylene monomer and dimer, maintaining the mixture at a temperature within the range of —50° C. to +100° C., and polymerizing the mixture by the application thereto of boron trifluoride to produce a lubricating oil.

2. The method of producing a lubricating oil comprising the steps of mixing substantial proportions of isobutylene monomer and dimer, cooling the mixture to a temperature between —50° C. and 0° C., and polymerizing the mixture by the application thereto of boron trifluoride to produce a lubricating oil.

3. The method of producing a lubricating oil comprising the steps of mixing isobutylene monomer and dimer in a proportion ranging between 50 parts of isobutylene monomer with 50 parts of dimer and 500 parts of isobutylene monomer to 50 parts of dimer, cooling the mixture to a temperature between —50° C. and 0° C., and polymerizing the cooled mixture by the application thereto of boron trifluoride to produce a lubricating oil.

4. The method of producing a lubricating oil comprising the steps of mixing substantial proportions of isobutylene monomer and dimer, cooling the mixture to a temperature of approximately —40° C., and polymerizing the cooled mixture by the application thereto of boron trifluoride to produce a lubricating oil.

5. The method of producing a lubricating oil comprising the steps of mixing isobutylene monomer and dimer in the proportion of approximately equal parts, cooling the mixture to a temperature between —50° C. and 0° C., and polymerizing the cooled mixture by the application thereto of boron trifluoride to produce a lubricating oil.

6. The method of producing a lubricating oil comprising the steps of mixing isobutylene monomer and dimer in the proportion of approximately equal parts, cooling the mixture to a temperature between —50° C. and 0° C., and polymerizing the cooled mixture by the application thereto of boron trifluoride to produce a lubricating oil having a viscosity at 100° F. of approximately 4600 seconds Saybolt, a viscosity at 210° F. of approximately 288 seconds Saybolt, and a viscosity index above 93.

HELMUTH G. SCHNEIDER.
LEWIS A. BANNON.